F. C. NEWELL, Jr.
PHRENOLOGICAL CHART.
APPLICATION FILED FEB. 19, 1921.

1,410,342.

Patented Mar. 21, 1922.
3 SHEETS—SHEET 1.

WITNESSES

INVENTOR
FRANK C. NEWELL JR.
BY
ATTORNEYS

F. C. NEWELL, Jr.
PHRENOLOGICAL CHART.
APPLICATION FILED FEB. 19, 1921.

1,410,342.

Patented Mar. 21, 1922.
3 SHEETS—SHEET 2.

WITNESSES

INVENTOR
FRANK C. NEWELL, JR.
BY Munn & Co.
ATTORNEYS

F. C. NEWELL, Jr.
PHRENOLOGICAL CHART.
APPLICATION FILED FEB. 19, 1921.

1,410,342.

Patented Mar. 21, 1922.
3 SHEETS—SHEET 3.

WITNESSES

INVENTOR
FRANK C. NEWELL JR
BY
ATTORNEYS

UNITED STATES PATENT OFFICE.

FRANK CLARENCE NEWELL, JR., OF NEW YORK, N. Y., ASSIGNOR, BY MESNE ASSIGNMENTS, TO LEWIS D. SAMPSON, OF NEW YORK, N. Y.

PHRENOLOGICAL CHART.

1,410,342. Specification of Letters Patent. Patented Mar. 21, 1922.

Application filed February 19, 1921. Serial No. 446,369.

*To all whom it may concern:*

Be it known that I, FRANK C. NEWELL, Jr., a citizen of the United States, residing in the city of New York, borough of Manhattan, in the county and State of New York, have invented a new and useful Improvement in Phrenological Charts, of which the following is a specification.

My invention has for its object to provide a chart with a plurality of rotatable members or cards each having illustrated thereon similar portions or sections from a number of different types of heads so that the members or cards may be rotated relatively to each other to bring into position selected portions or sections on the members or cards to form a complete head.

Another object of the invention is to print on the members or cards information explaining the personal characteristics indicated by the portions or sections of the heads shown on the cards, so that when the cards have been rotated to bring the portions or sections into position to form a complete head, the printed matter may be read to determine the personal characteristics of a person having a head similar to the head referred to.

Still another object of the invention is to print on one of the cards a representation of a complete head with markings on the representation referring to traits of character, the member having an opening through which may be seen a further description of the markings which are arranged on another card so that one of the cards may be rotated relatively to another to exhibit through the opening the descriptions of the markings one at a time.

Still additional objects of the invention will appear in the following specification in which the preferred form of my invention is described.

In the drawings similar reference characters refer to similar parts in all the views in which—

Figure 2:
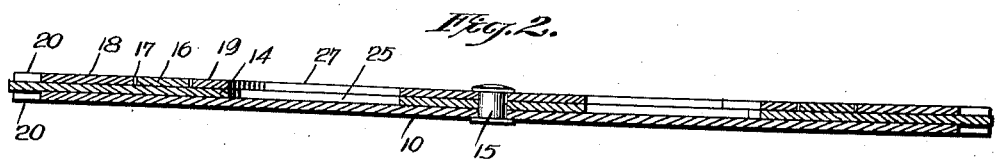
Figure 2 is a transverse sectional view of Fig. 1.
Figure 3:
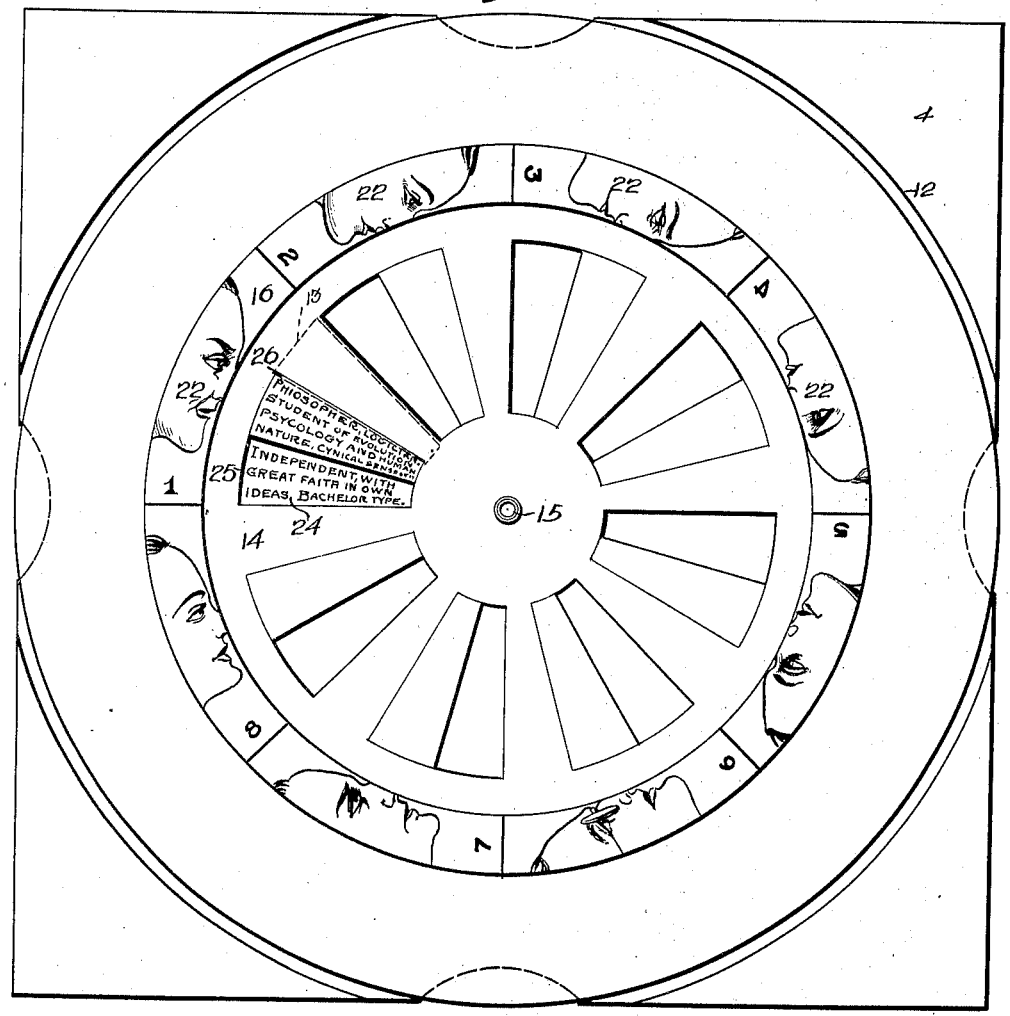
Figure 3 is a plan view similar to that shown in Fig. 1, but with two of the cards removed.
Figure 4:
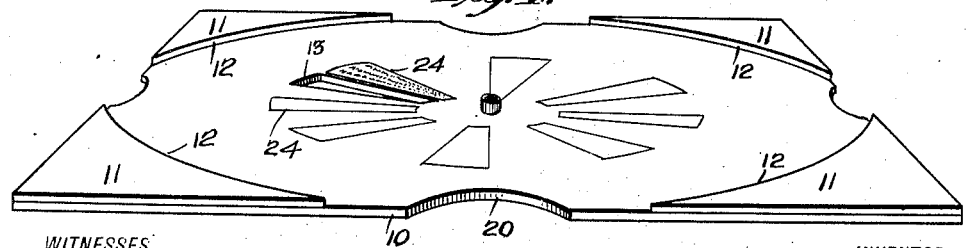
Figure 4 is a perspective view of the bottom card.

By referring to the drawings it will be seen that the bottom member or card 10, has corner pieces 11, the inner sides 12 of which are concentric, forming a circular guideway. Through this card 10, there is an opening 13. Rotatably disposed in the circular guideway 12 there is a card 14, this card 14 being pivoted to the card 10 at 15, an annular member 16 being secured to the card 14 as best illustrated in Fig. 2 of the drawings. This annular member 16 is disposed in a circular opening 17 in a card 18 which is secured to the corner pieces 11. Mounted for rotating within the annular member 16 there is a card 19 which is pivoted at 15. The cards 18 and 10 have cut out portions 20 so that the card 14 may be readily rotated between the cards 10 and 18.

Figure 1:
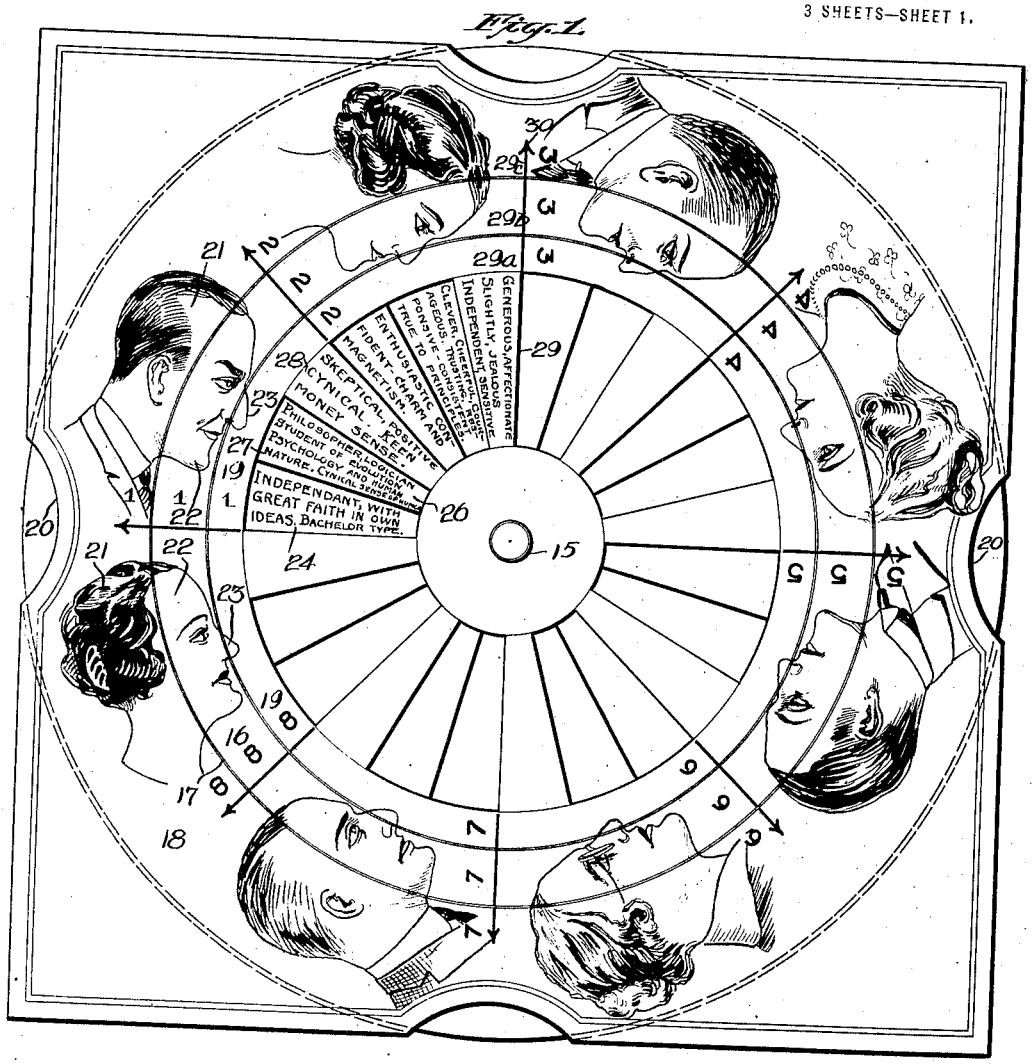
Figure 1 is a plan view showing my invention, the descriptions of the features shown on some of the cards being omitted.

Illustrated on the card 18 at its circular opening 17 there are representations of the rear portions of heads 21, the heads being of different types. These rear portions of heads 21 are spaced apart as best illustrated in Fig. 1 of the drawings. Illustrated on the member 16 secured to the card 14 there are faces 22 of different types which are so disposed as to register with the rear portions of the heads 21. On the card 19 there are illustrated noses 23 of different types which are so disposed as to register with the faces 22. It will therefore be seen that a rear portion of a head 21, a face 22 and a nose 23 may be selected and that the cards may be rotated to bring the selected head, face and nose into position to form a complete head.

Disposed radially from the rear portions of the heads 21 there are spaces on the card 10 at 24 on which is printed information describing the characteristics of persons having the rear portions of the heads 21 as illustrated on the card 18. There are radial openings 25 in the card 14 to exhibit the information printed at 24 on the card 10. There is also printed on the card 14 adjacent these openings information describing the characteristics of the faces which are illustrated on the members 19 and 16 and are disposed radially with reference to the said information. This information printed on the card 14 is illustrated at 26. The card 19 is also provided with similar openings 27 which are provided to exhibit the information printed at 24 on the card 10, and at 26 on the card 14; there is also printed on the card 19 at 28 information describing the characteristics of the noses 23, illustrated on the said card 19.

With this arrangement it is possible after arranging the selected nose, face and rear portion of a head to complete a head of a predetermined type to read the characteristics of the completed head at the spaces 24, 26 and 28, which are disposed radially relatively to the completed head.

As illustrated in Fig. 1 of the drawings, the lines 29, 29ª, 29ᵇ and 29ᶜ, terminating in the arrow heads 30, are provided to assist in moving or rotating the cards to positions where the different features of the heads will register with each other. Of course, pivot 15 serves not only as a pivot, but it also serves to hold the cards in position relatively to each other.

Figure 5:
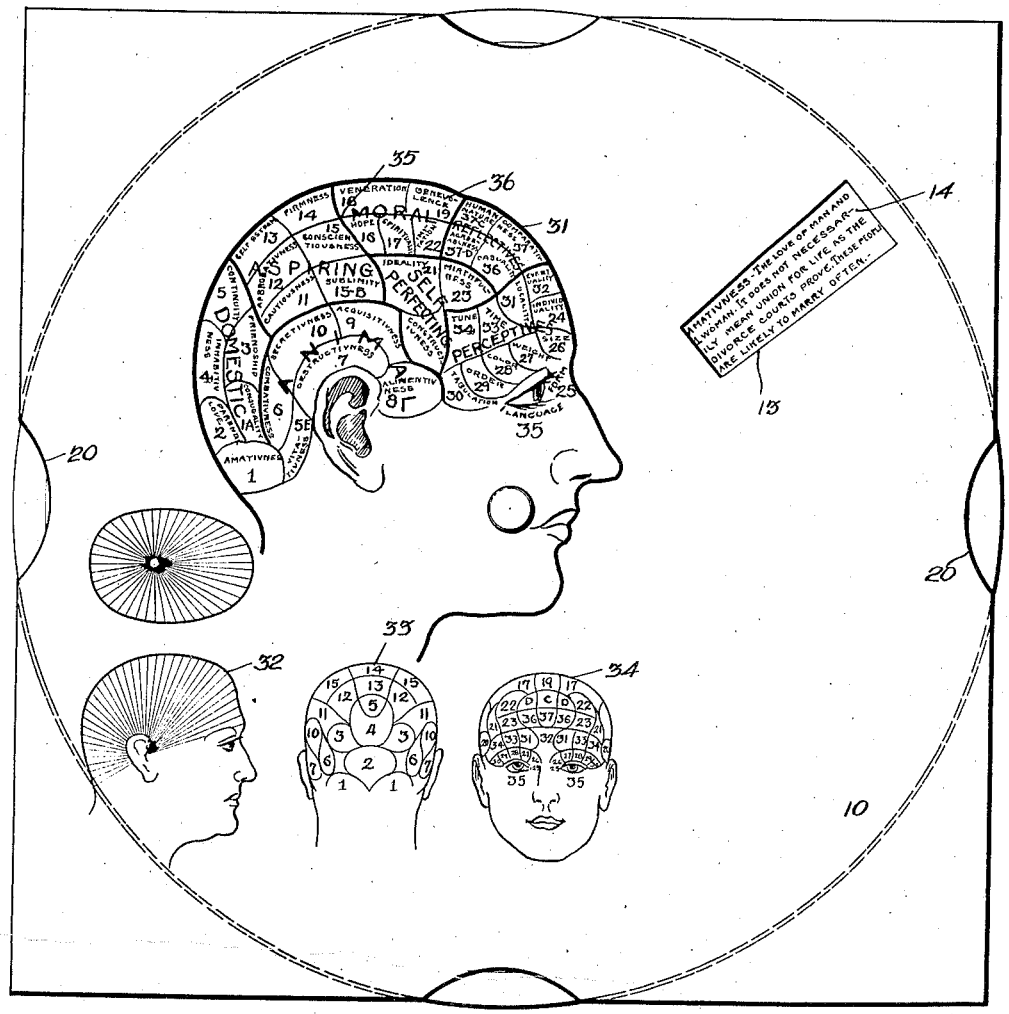
Figure 5 is an inverted plan view of the bottom card.
Figure 6:
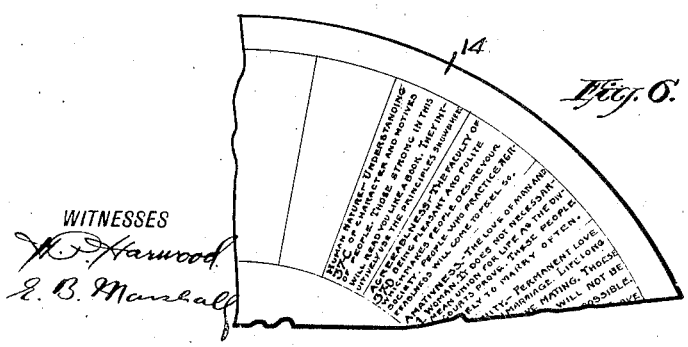
Figure 6 is a fragmentary inverted plan view of one of the cards.

On the reverse or under side of the card 10, which is shown in Figure 5, there is a representation of a head 31, and additional representations of heads 32, 33 and 34. The representation of the head 31 has dividing lines 35 and marks and numbers 36. On the under or reverse side of the card 14, which is best shown in Fig. 6, there is printed information which refers to the markings 36 on the representation of the head 31, this information describing in some detail the characteristics of the markings 36 on the representation of the head 31.

In using the chart the cards 14 and 19 may be rotated to complete a head of any desired type and after the information on the spaces 24, 26 and 28 has been read the chart may be reversed and additional information may be obtained by referring to the representation of the head 31 and the information printed on the card 14 which is exhibited through the opening 13.

I claim:

1. In a device of the character described, a plurality of members rotatable relatively to each other, each member having illustrated thereon similar sections from a number of heads of different types, the sections of the heads on each member representing portion of heads which are different from the sections on the other members, so that the members may be rotated relatively to each other to bring into position selected sections on the members to form a complete head, and information on the members disposed uniformly and spaced radially from the sections describing the characteristics of the features shown on the heads, which when the members are moved to complete a head, may be conveniently read to obtain information with reference to the said features.

2. In a device of the character described, a plurality of members disposed over each other, the members being movable relatively to each other, each member having illustrated thereon similar sections from a number of heads of different types, the sections of the heads on each member representing portions of heads which are different from the sections on the other members, so that the members may be moved relatively to each other to bring into position selected sections on the members to form a complete head, there being openings in the upper members and information indicated on the members concerning the characteristics of the section shown, the information on the under members being exhibited through the openings.

3. In a device of the character described, a plurality of members disposed over each other, the members being movable relatively to each other, each member having illustrated thereon similar sections from a number of heads of different types, the sections of the heads on each member representing portions of heads which are different from the sections on the other members so that the members may be moved relatively to each other to bring into position selected sections on the members to form a complete head, there being openings in the upper members opposite the sections, information on the members opposite the sections describing the latter, the information on the under members being exhibited through the openings.

4. In a device of the character described, a plurality of members disposed over each other and rotatable relatively to each other, each member having illustrated thereon similar sections from a number of heads of different types, the sections of the heads on each member representing portions of heads which are different from the sections on the other members so that the members may be moved relatively to each other to bring into position selected sections on the members to form a complete head, there being openings in the upper members disposed radially relatively to the sections and information on the members opposite the sections describing the characteristics of the sections shown, the information on the under members being exhibited through the openings.

5. In a device of the character described, a plurality of members disposed over each other, each member having illustrated thereon similar sections from a number of figures of different types, the sections of the figures on each member representing portions of the figures which are different from the sections on the other members so that the members may be moved relatively to each other to bring into position selected sections on the members to form a complete figure, there being openings in the upper members disposed radially relatively to the sections, and information on the members opposite the sections describing the sections, the information on the under members being exhibited through the openings.

6. In a device of the character described, a member having illustrated thereon sections from the backs of heads of different types, the extreme backs of the heads being disposed radially relatively to the remainder of the heads, a second member rotatable relatively to the first member and having illustrated thereon faces from heads of different types, with the mouths disposed radially relatively to the remainder of the faces, and a third member rotatable relatively to the first and second members and having illustrated thereon noses from heads of different types, the noses extending radially.

7. In a device of the character described, a member having illustrated thereon backs of heads of different types, and disposed radially relatively to the backs of the heads information describing the characteristics of the backs of the heads, a second member rotatable relatively to the first member and having illustrated thereon faces from heads of different types, the second member being provided with openings to exhibit the information on the first member, the faces on the second member being disposed radially relatively to the openings, and there being disposed adjacent the openings in the second member, information describing the characteristics of the faces on the second member, and a third member rotatable relatively to the first and second members and having illustrated thereon noses of different types for registering with the faces on the second member, there being openings in the third member for exhibiting the information on the first and second members, and information on the third member at its openings describing the characteristics of the noses illustrated thereon.

8. In a device of the character described, a plurality of cards disposed over each other and rotatable relatively to each other, each card having illustrated thereon similar sections from a number of heads of different types, the illustrations appearing on the surfaces of the cards which are normally disposed upwardly, the under side of what is normally the bottom card having indicated thereon a representation of a head with markings thereon and being provided with an opening and information on the under side of another card referring to the markings which may be exhibited at the opening.

9. In a device of the character described, a top card, a bottom card, the cards being spaced apart and being secured together, the top card having a central opening and indicated thereon the representations of backs of heads of different types, a third card rotatable between the first two cards and having indicated thereon the representations of faces for registering with the backs of the heads, and a fourth card rotatable at said opening relatively to the other cards and having indicated thereon noses for registering with the representations of the faces.

10. In a device of the character described, a top card, a bottom card, the cards being spaced apart and being secured together, the top card having a central opening and indicated thereon the representations of backs of heads of different types, a third card rotatable between the first two cards and having indicated thereon the representations of faces for registering with the backs of the heads, and a fourth card rotatable relatively to the other cards and having indicated thereon noses for registering with the representations of the faces, the under side of the bottom card having indicated thereon the representation of a head with markings thereon and being provided with an opening, and there being on the under side of the third card information referring to the markings which may be exhibited at the openings in the bottom card.

11. In a device of the character described, a top card, a bottom card, the two cards being spaced apart and secured together, there being a central opening in the top card and representations of the backs of heads on the top card at the opening, a third card rotatable between the first two cards and having indicated thereon representations of faces for registering with the backs of the heads, there being openings in the third card disposed radially relative to the faces, a fourth card rotatable relatively to the other cards and having indicated thereon representations of noses for registering with the faces, there being openings in the fourth card disposed radially relatively to the representations of the noses and information on the bottom card describing the characteristics of the backs of the heads which may be exhibited through the openings in the third and fourth cards, there being information on the third card describing the characteristics of the faces, which may be exhibited through the opening in the fourth card and there being information on the fourth card, describing the characteristics of the noses.

12. In a device of the character described, a top card, a bottom card, the two cards being spaced apart and secured together, there being a central opening in the top card and representations of the backs of heads on the top card at the opening, a third card rotatable between the first two cards and having indicated thereon representations of faces for registering with the backs of the heads, there being openings in the third card disposed radially relative to the faces, a fourth card rotatable relatively to the other cards and having indicated thereon representations of noses for registering with the faces, there being openings in the fourth card disposed radially relatively to the representations of the noses and information on the bottom card describing the characteristics of the backs of the heads which may be exhibited through the openings in the third and fourth cards, there being information on the third card describing the characteristics of the faces, which may be exhibited through the opening in the fourth card there being information on the fourth card, describing the characteristics of the noses, there being an opening in the bottom card, there being a representation of a head on the underside of the bottom card with markings, and there being information on the under side of the the third mentioned card describing the markings, which may be exhibited through the opening in the bottom card.

FRANK CLARENCE NEWELL, Jr.